United States Patent
Kikumoto (10) Patent No.: US 9,973,640 B2
(45) Date of Patent: May 15, 2018

(54) DISPLAY DEVICE AND METHOD AND NON-TRANSITORY COMPUTER READABLE MEDIUM

(71) Applicant: FUJI XEROX CO., LTD., Tokyo (JP)

(72) Inventor: Takashi Kikumoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days. days.

(21) Appl. No.: 15/357,097

(22) Filed: Nov. 21, 2016

(65) Prior Publication Data
US 2017/0366690 A1 Dec. 21, 2017

(30) Foreign Application Priority Data
Jun. 16, 2016 (JP) ................. 2016-119686

(51) Int. Cl.
*G06F 3/12* (2006.01)
*H04N 1/00* (2006.01)
*G06K 15/00* (2006.01)

(52) U.S. Cl.
CPC ....... *H04N 1/00477* (2013.01); *H04N 1/0048* (2013.01); *H04N 1/0049* (2013.01); *H04N 2201/0094* (2013.01)

(58) Field of Classification Search
None
See application file for complete search history.

(56) References Cited

U.S. PATENT DOCUMENTS

2014/0026092 A1   1/2014 Oguma et al.
2014/0368866 A1*  12/2014 Kikumoto ............ G06K 15/005
                                         358/1.15

FOREIGN PATENT DOCUMENTS

JP       2013-196126 A    9/2013
JP          5612031 B2   10/2014

* cited by examiner

*Primary Examiner* — Dov Popovici
(74) *Attorney, Agent, or Firm* — Oliff PLC (57) ABSTRACT

A display device includes the following elements. An obtaining unit obtains a processing description and a processing state of each processing operation. A specifying unit specifies a processing state. A first display controller performs control so that a processing description of a processing operation belonging to the specified processing state is displayed in a first region. A second display controller performs control for each processing state so that an image reflecting the number of processing operations belonging to the corresponding processing state is displayed in a second region, and so that, if the number of processing operations belonging to a processing state that is not specified is changed, an image reflecting the changed number is redisplayed in a first mode and, if the number of processing operations belonging to a specified processing state is changed, an image reflecting the changed number is redisplayed in a second mode.

8 Claims, 8 Drawing Sheets

| ID | STATE | PROCESSING NAME | SIZE | INSTRUCTION RECEIVED DATE | NUMBER OF COPIES |
|---|---|---|---|---|---|
| ... | ... | ... | ... | ... | ... |
| ... | ... | ... | ... | ... | ... |
| ... | ... | ... | ... | ... | ... |
| ... | ... | ... | ... | ... | ... |

| ID | CHECKED |
|---|---|
| ... | YES |
| ... | NO |
| ... | YES |
| ... | NO |

| ID | PROCESSING NAME | SIZE | INFORMATION | INSTRUCTION RECEIVED DATE | NUMBER OF COPIES |
|---|---|---|---|---|---|
| 515 | 1page.ps(2)(1)(2) | 1 KB | | MARCH 25, 2016 1:32:19 PM | 1 |
| 514 | 1page.ps(1)(1)(1)(2) | 1 KB | | MARCH 25, 2016 1:32:19 PM | 1 |
| 513 | 1page.ps(1)(2)(2) | 1 KB | | MARCH 25, 2016 1:32:19 PM | 1 |
| 516 | 1page.ps(4)(1) | 1 KB | | MARCH 25, 2016 1:32:19 PM | 1 |

| ID | PROCESSING NAME | INFORMATION | PROGRESS STAGE | RIP | INSTRUCTION RECEIVED DATE |
|---|---|---|---|---|---|
| 264 | 1page.ps(3)(1) | [p] Q | RASTER IMAGE GENERATED | ■ | MARCH 25, 2016 1:32:19 PM |
| 511 | 1page.ps(2)(3) | [p] Q | RASTER IMAGE GENERATED | ■ | MARCH 25, 2016 1:32:19 PM |
| 1622 | Error1.ps | [p] Q | IN DATA PROCESSING | ■□ | MARCH 25, 2016 6:32:37 PM |

| HOLD: 1670 OPERATIONS | ERROR: 1 OPERATION | COMPLETED: 6 OPERATIONS |

FIG. 13B

| HOLD: 1670 OPERATIONS | ERROR: 2(1) OPERATIONS | COMPLETED: 8(2) OPERATIONS |

FIG. 13C

| HOLD: 1670 OPERATIONS | ERROR: 2(1) OPERATIONS | COMPLETED: 8 OPERATIONS |

DISPLAY DEVICE AND METHOD AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-119686 filed Jun. 16, 2016.

BACKGROUND

Technical Field

The present invention relates to a display device and method and a non-transitory computer readable medium.

SUMMARY

According to an aspect of the invention, there is provided a display device including an obtaining unit, a specifying unit, and first and second display controllers. The obtaining unit obtains a processing description and a processing state of each of plural processing operations that a processing device is instructed to execute. The specifying unit specifies a processing state from among plural processing states. The first display controller performs control so that, among the plural processing operations, a processing description of a processing operation which belongs to the processing state specified by the specifying unit will be displayed in a first region. The second display controller performs control for each of the plural processing states so that an image reflecting the number of processing operations which belong to the corresponding processing state will be displayed in a second region. The second display controller performs control so that, in response to a change in the number of processing operations which belong to a processing state that is not specified, an image reflecting the changed number will be redisplayed in a first mode and so that, in response to a change in the number of processing operations which belong to a specified processing state, an image reflecting the changed number will be redisplayed in a second mode.

BRIEF DESCRIPTION OF THE DRAWINGS

An exemplary embodiment of the present invention will be described in detail based on the following figures, wherein.

DETAILED DESCRIPTION

1. Exemplary Embodiment 1-1. Overall Configuration of Processing System

Figure 1:
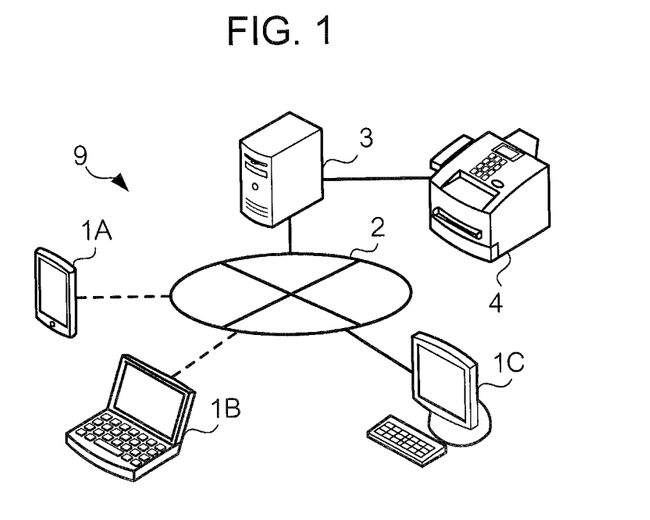
FIG. 1 illustrates the overall configuration of a processing system according to an exemplary embodiment.

FIG. 1 illustrates the overall configuration of a processing system 9 according to an exemplary embodiment. The processing system 9 includes a communication network 2 which forms a local area network (LAN), plural terminals 1 connected to the communication network 2, and a server device 3. In FIG. 1, the plural terminals 1 are constituted by terminals 1A, 1B, and 1C. Hereinafter, the terminals 1A, 1B, and 1C will simply be called the terminal 1 unless it is necessary to distinguish them from each other. The processing system 9 also includes a processing device 4 which is connected to the server device 3 via a wired or wireless medium and is managed by the server device 3.

The processing device 4 has an image reading function (scanner) of optically reading an image formed on a medium such as paper, and an image forming function (printer) of forming an image on a medium such as paper on the basis of image data.

The processing device 4 is connected to a public switched telephone network (not shown) and also has an image sending function (fax machine) of sending image data to another device.

The processing device 4 also has an image processing function of processing obtained image data by performing various arithmetic operations.

The terminal 1 is connected to the server device 3 via, for example, a wireless access point (not shown) connected to the communication network 2. The wireless access point provides a function of connecting the terminal 1 and the communication network 2 in accordance with a method compliant with the wireless LAN standards, for example, IEEE802.11. The terminal 1 may be connected to the communication network 2 via a wired medium to send and receive information with the server device 3.

1-2. Configuration of Terminal

Figure 2:
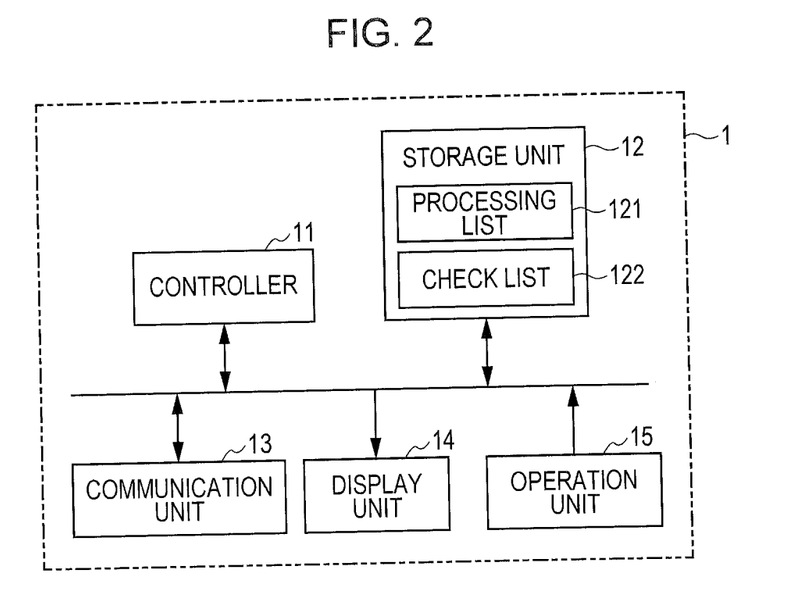
FIG. 2 illustrates an example of the configuration of a terminal.

The terminal 1 is an example of a display device that is connected to the server device 3 to obtain information concerning processing operations executed by the processing device 4 managed by the server device 3 and to display the obtained information. FIG. 2 illustrates an example of the configuration of the terminal 1. The terminal 1 includes a controller 11, a storage unit 12, a communication unit 13, a display unit 14, and an operation unit 15.

The controller 11 includes a central processing unit (CPU), a read only memory (ROM), and a random access memory (RAM). The controller 11 controls the individual elements of the terminal 1 as a result of the CPU reading and executing a computer program (hereinafter simply called a program) stored in the ROM or the storage unit 12.

The communication unit 13 is a communication circuit that is connected to the communication network 2 via a wireless access point, for example.

The operation unit 15 includes operators such as operation buttons and a touch panel for inputting various instructions. The operation unit 15 receives a user operation and supplies a signal indicating the content of the user operation to the controller 11.

The display unit 14 includes a liquid crystal display and displays various items of information concerning instructions provided by the controller 11. The touch panel provided in the operation unit 15 may be overlaid on the liquid crystal display of the display unit 14. In this case, a touch panel made of a transparent material is used so that the user can see images displayed on the liquid crystal display.

The storage unit 12 is a large-capacity storage device, such as a solid state drive, and stores a program read by the CPU of the controller 11. The storage unit 12 stores a processing list 121 and a check list 122, as shown in FIG. 2.

The processing list 121 is a list of information sent from the server device 3 via the communication network 2. In the processing list 121, each of the descriptions of plural processing operations (processing descriptions) that the processing device 4 is instructed to execute is associated with the progress state of the corresponding processing operation (processing state).

The check list 122 is a list indicating whether each of the processing descriptions indicated in the processing list 121 has been checked by a user.

Figure 3A:
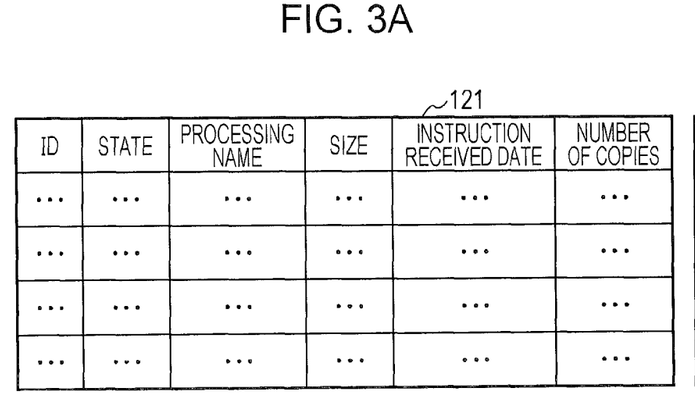
FIGS. 3A and 3B respectively illustrate examples of a processing list and a check list.

FIGS. 3A and 3B respectively show examples of the processing list 121 and the check list 122. As shown in FIG. 3A, the processing list 121 associates each of the descriptions of processing operations that the processing device 4 is instructed to execute with the processing state. The processing list 121 includes plural records in which the following fields are associated with each other. "ID" indicates identification information for identifying processing. "State" indicates the processing state. "Processing name" indicates the name of processing. "Size" indicates the size of processing data. "Instruction received date" indicates the date at which the processing device 4 has started to receive a processing instruction. "Number of copies" indicates the number of times that processing is repeated.

Figure 3B:
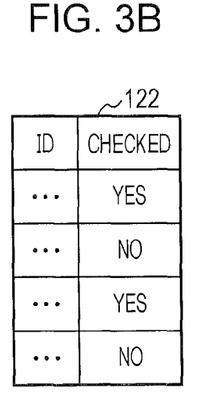

As shown in FIG. 3B, the check list 122 associates each of plural processing operations that the processing device 4 is instructed to execute with information regarding whether the description of the corresponding processing has been checked by the user. The check list 122 includes plural records in which the following fields are associated with each other. "ID" indicates identification information concerning processing. "Checked" indicates whether the description of processing indicated by the ID has been checked by the user. In FIG. 3B, in the field "checked", "YES" means that the user has already checked the description of processing, and "NO" means that the user has not yet checked the description of processing. Whether the user has checked the description of processing is estimated according to whether the description of processing is displayed on the display unit 14 of the terminal 1. Alternatively, the user may visually check the description of processing indicated by the ID and input this information.

1-3. Configuration of Server Device

Figure 4:
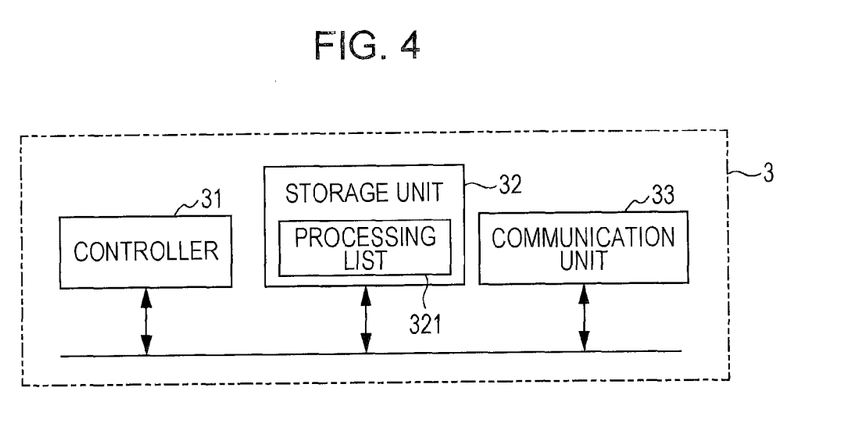
FIG. 4 illustrates an example of the configuration of a server device.

FIG. 4 illustrates an example of the configuration of the server device 3. A controller 31 includes a CPU, a ROM, and a RAM, and controls the individual elements of the server device 3 as a result of the CPU reading and executing a program stored in the ROM or a storage unit 32.

The storage unit 32 is a large-capacity storage device, such as a hard disk drive, and stores a program read by the CPU of the controller 31. The storage unit 32 stores a processing list 321. The processing list 321 serves as the original of the processing list 121 stored in the storage unit 12 of the terminal 1, and includes the descriptions of the processing list 121.

A communication unit 33 is a communication circuit that is connected to the communication network 2 via a wired or wireless medium. The communication unit 33 also includes a communication circuit that is connected to the processing device 4 via a wired or wireless medium.

1-4. Configuration of Processing Device

Figure 5:
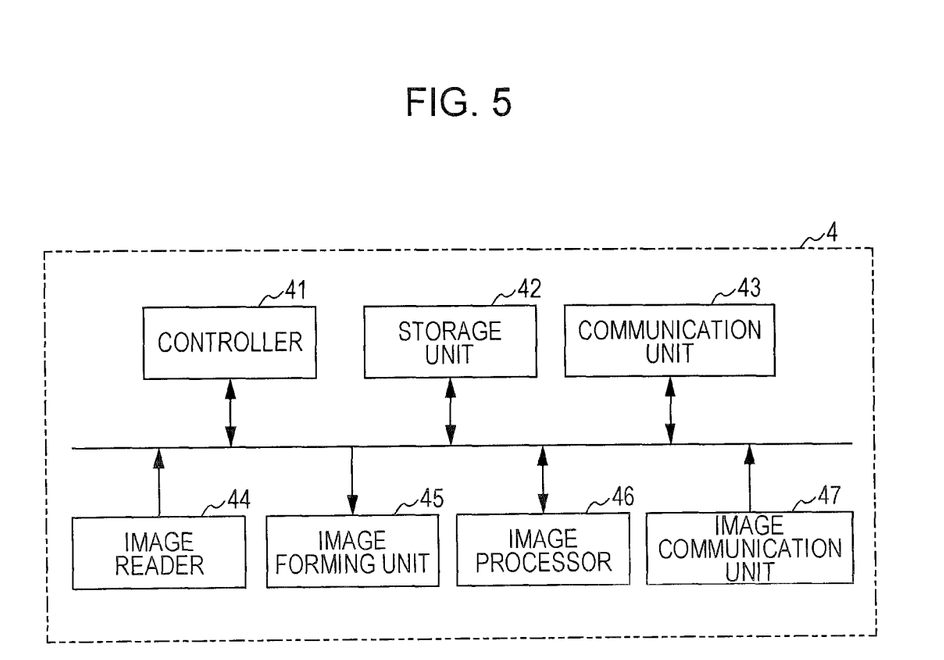
FIG. 5 illustrates an example of the configuration of a processing device.

FIG. 5 illustrates an example of the configuration of the processing device 4. A controller 41 includes a CPU, a ROM, and a RAM, and controls the individual elements of the processing device 4 as a result of the CPU reading and executing a program stored in the ROM or a storage unit 42.

The storage unit 42 is a large-capacity storage device, such as a hard disk drive, and stores a program read by the CPU of the controller 41.

A communication unit 43 is a communication circuit that is connected to the server device 3 via a wired or wireless medium.

An image reader 44 optically reads a document. The image reader 44 includes imaging elements such as charge coupled device (CCD) image sensor elements, and generates image data representing a document. The image reader 44 may be either one of a flatbed type which reads a document by moving imaging elements and a sheet feed type which feeds and reads a document without changing the position of imaging elements. The image reader 44 may be another type.

An image forming unit 45 forms an image based on image data. The image forming unit 45 may form an image on a medium such as paper according to an electrophotographic system or a thermal transfer method.

An image processor 46 executes various arithmetic operations and processing operations on image data. The image processor 46 may be a processing unit called a graphic board or a graphics processing unit (GPU).

An image communication unit 47 is a communication circuit that is connected to another device via a telephone network such as a public switched telephone network and a communication network so as to send and receive image data.

The controller 41 controls resources such as the image reader 44, the image forming unit 45, the image processor 46, and the image communication unit 47, and executes processing by using these resources in response to instructions from users.

1-5. Functional Configuration of Terminal

Figure 6:
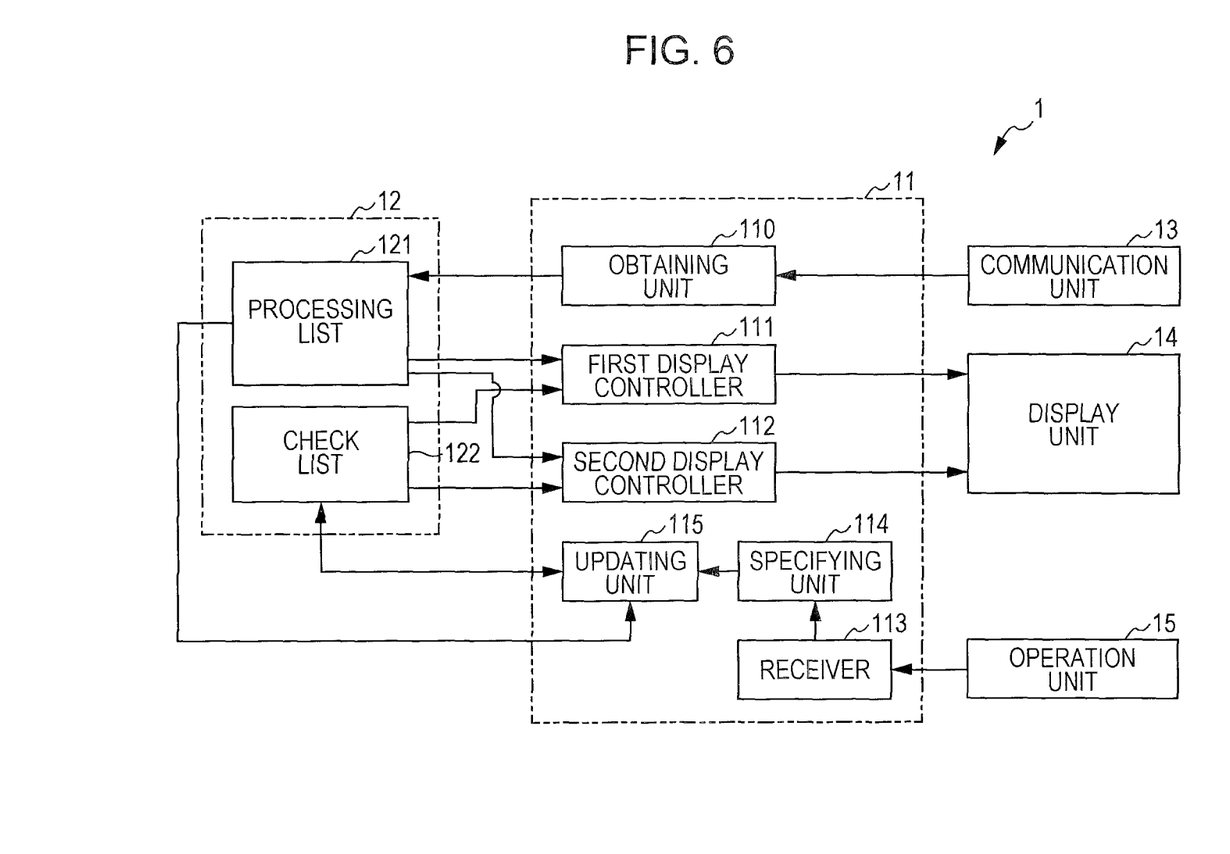
FIG. 6 illustrates an example of the functional configuration of a terminal.

FIG. 6 illustrates an example of the functional configuration of the terminal 1. As a result of executing a program read from the storage unit 12, the controller 11 functions as an obtaining unit 110, a first display controller 111, a second display controller 112, a receiver 113, a specifying unit 114, and an updating unit 115.

The server device 3 receives a processing instruction from the individual plural terminals 1 connected to the communication network 2, and generates a processing list 321 describing these instructions. Based on the generated processing list 321, the server device 3 decides the order of processing instructions to be executed by the processing device 4 and instructs the processing device 4 to execute the processing instructions. The server device 3 also monitors the processing state concerning each of the processing operations that the server device 3 has instructed the processing device 4 to execute, and updates the processing list 321 according to the monitoring results.

The server device 3 sends a signal based on the processing list 321 to the terminal 1. The server device 3 may send this signal in response to a request from the terminal 1 or at a predetermined timing. The predetermined timing may be a regular timing, a timing at which the processing list 321 is updated, or a timing that satisfies a predetermined condition, such as that the number of processing operations which belong to a certain processing state exceeds a prescribed number. That is, the mode in which a signal based on the processing list 321 is sent to the terminal 1 may be a push type based on the server 3 or a pull type based on the terminal 1.

The obtaining unit 110 receives a signal based on the processing list 321 from the server device 3, and generates a processing list 121 based on this signal. As a result of generating the processing list 121, the obtaining unit 110 is able to obtain the processing description and processing state concerning each of the processing operations that the processing device 4 is instructed to execute.

If the terminal 1 is in the initial state, such as at the start of the terminal 1, the obtaining unit 110 generates a processing list 121 reflecting the processing list 321 generated by the server device 3. At the start of the terminal 1, a check list 122 in the initial state has been generated and stored in the storage unit 12. In the check list 122 in the initial state, the field "checked" indicates "NO" for all records. That is, the check list 122 in the initial state indicates that the descriptions of all processing operations have not yet been checked.

The receiver 113 receives a signal indicating the content of an operation performed by the user from the operation unit 15. The specifying unit 114 specifies a processing state selected by the user in accordance with the signal received by the receiver 113.

The first display controller 111 performs control so that, among the plural processing operations, the descriptions of processing operations which belong to the processing state specified by the specifying unit 114 will be displayed on the display unit 14.

The second display controller 112 performs control for each processing state so that an image reflecting the number of processing operations which belong to the corresponding processing state will be displayed on the display unit 14.

If the number of processing operations which belong to a processing state that is not specified is changed, the second display controller 112 performs control so that an image reflecting the updated number will be redisplayed in a first mode. If the number of processing operations which belong to a specified processing state is changed, the second display controller 112 performs control so that an image reflecting the updated number will be redisplayed in a second mode, which is different from the first mode.

The updating unit 115 updates the check list 122, based on the processing state specified by the specifying unit 114 and the processing list 121 generated by the obtaining unit 110.

Figure 7:
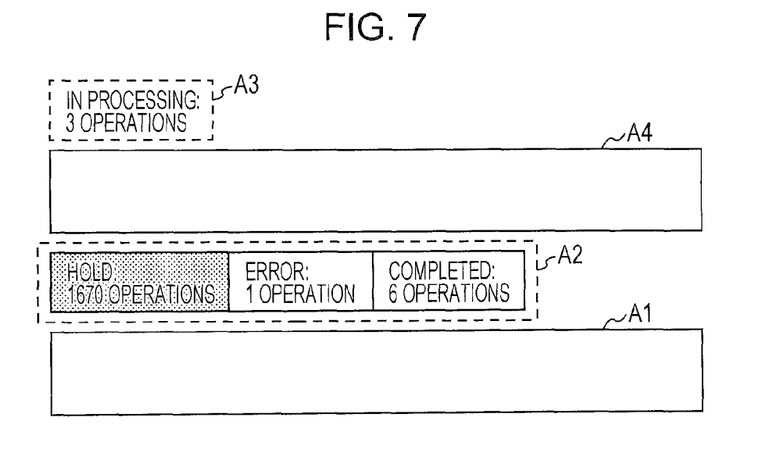
FIG. 7 is a view for explaining the descriptions displayed by a control operation of first and second display controllers.

FIG. 7 is a view for explaining the descriptions displayed on the display unit 14 by a control operation of the first and second display controllers 111 and 112. The first display controller 111 controls the display unit 14 so that the descriptions of processing operations which belong to the processing state specified by the specifying unit 114 will be displayed in a first region A1 of the display unit 14.

As shown in FIG. 7, a second region A2 is provided above the first region A1. The second region A2 indicates a processing state selected by the user. In the second region A2, rectangular portions indicating the processing states are called tabs, for example. The second display controller 112 controls the display unit 14 so that, for each processing state, an image reflecting the number of processing operations which belong to the corresponding processing state will be displayed in the second region A2. In the example shown in FIG. 7, an image indicating an Arabic numeral representing the number of processing operations which belong to a processing state and a character string representing a unit such as "operations" is displayed in the second region A2.

The processing states shown in FIG. 7 are three states "hold", "error", and "completed". "Hold" indicates a processing state in which processing is not yet executed. "Error" indicates a processing state in which processing is terminated with an error. "Completed" indicates a processing state in which processing has successfully been completed.

For example, if 1670 operations belong to the processing state "hold", the character string "1670 operations" is described next to the character string "hold" in the second region A2 of the display unit 14, as shown in FIG. 7.

If the user operates an indicator and brings it into contact with the rectangular portion with the character string "hold" in the second region A2, the touch panel of the operation unit 15 detects this contact operation, and the receiver 113 receives a signal indicating the content of this operation from the operation unit 15. Then, the specifying unit 114 specifies "hold" from among the plural processing states in accordance with the signal received by the receiver 113.

The controller 11 then performs control so that a background color of the rectangular portion of the specified processing state "hold" will be changed to a color different from that of the other rectangular portions and this rectangular portion will be redisplayed on the display unit 14. This allows the user to recognize which processing state the user has selected. The first display controller 111 performs control so that the processing descriptions stored in association with the specified processing state "hold" will be displayed in the first region A1 of the display unit 14.

Figure 8:
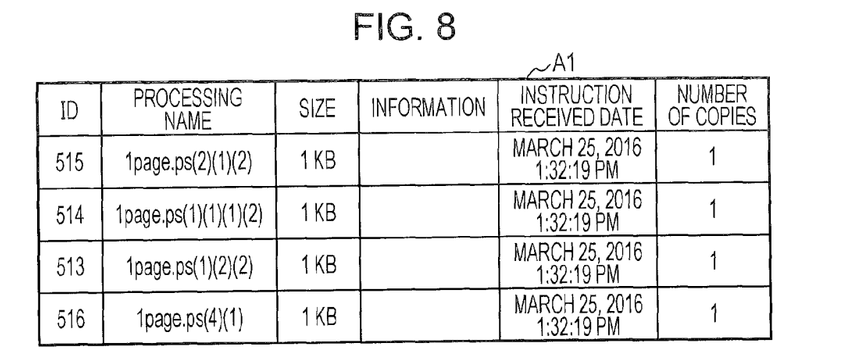
FIG. 8 illustrates an example of processing descriptions displayed in a first region of a display unit.

FIG. 8 illustrates an example of the processing descriptions displayed in the first region A1 of the display unit 14. In the first region A1, fields such as "ID", "processing name", "size", "instruction received date", and "number of copies" are displayed. If there is any additional information for processing, an image such as an icon or a character string is displayed in the field "information". If the first region A1 is displayed on a touch panel, the additional information may be displayed in a popup window as a result of the user bringing an indicator into contact with the icon displayed in "information".

In a third region A3 of the display unit 14, among the plural operations that the terminals 1 have instructed the processing device 4 to execute, the number of operations that are being processed by the processing device 4 is displayed. If three operations are being processed by the processing device 4, a character string "in processing: 3 operations" is displayed in the third region A3, as shown in FIG. 7.

Figure 9:
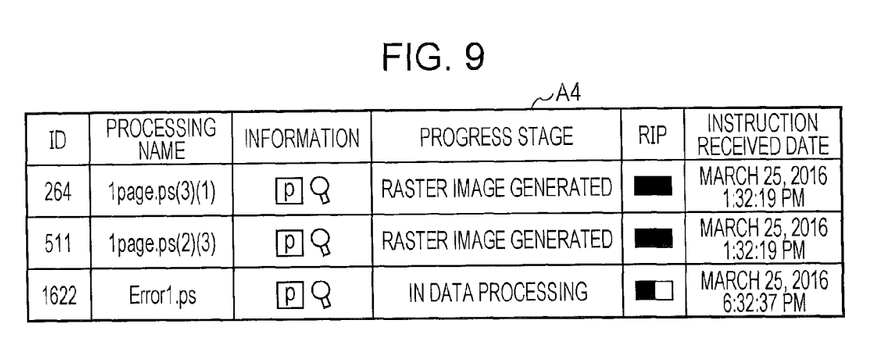
FIG. 9 illustrates an example of processing descriptions displayed in a fourth region of the display unit.

In a fourth region A4, the descriptions of processing operations that are being executed by the processing device 4 are displayed. FIG. 9 illustrates an example of processing descriptions displayed in the fourth region A4 of the display unit 14. In the fourth region A4, fields such as "ID", "processing name", "progress stage", "RIP", and "instruction received date" are displayed. If there is any additional information for processing, an image such as an icon or a character string is displayed in the field "information". "Progress stage" indicates to which stage processing has progressed if processing is divided into plural stages. "RIP"

indicates the progress state of raster image processor (RIP) processing in the form of an image such as a bar graph or a character string such as "80%".

If the processing executed by the processing device 4 progresses and the processing state is changed, the server device 3 monitors the progress and reflects it in the processing list 321. The server device 3 also receives processing instructions from the plural terminals 1 and adds such processing instructions to the processing list 321 whenever necessary. The processing list 321 can be updated in this manner.

The server device 3 then sends a signal to each terminal 1 based on the updated processing list 321. The signal may indicate information concerning processing operations that have been changed from the time at which the signal has previously been sent to each terminal 1. Alternatively, the signal may indicate the entire updated processing list 321.

Upon receiving a signal from the server device 3, the obtaining unit 110 of the controller 11 of the terminal 1 updates the processing list 121 based on the received signal. Then, the updating unit 115 of the controller 11 updates the check list 122 so that the "checked" field of the processing for which the processing state has changed is updated to "NO" indicating that the user has not yet checked.

When the processing list 121 is updated, the first display controller 111 performs control so that the descriptions of processing operations which belong to a processing state specified by the specifying unit 114 will be displayed in the first region A1. After this display operation, the first display controller 111 updates the check list 122 so that the "checked" field in the check list 122 for processing operations which belong to the specified processing state is updated to "YES" indicating that the user has checked. The first display controller 111 may overwrite the descriptions of processing operations to be displayed in the first region A1 only when the number of processing operations that belong to the specified processing state is changed.

If the processing state of a processing operation described in the processing list 121 is changed, the second display controller 112 changes and redisplays the image in the second region A2 by referring to the updated check list 122 and processing list 121. The second display controller 112 redisplays a rectangular portion indicating the processing state specified by the specifying unit 114 and rectangular portions indicating the processing states that are not specified by the specifying unit 114 in different modes.

If the number of processing operations which belong to a processing state that is not specified is changed, the second display controller 112 redisplays an image reflecting the updated number in a first mode. The first mode is a mode in which an image indicating the updated number appended with the difference between the updated number and the previous number is redisplayed, for example. More specifically, the second display controller 112 redisplays the following image. A pair of parentheses is added at the right side of the updated number and the number indicating the difference between the updated number and the previous number is input between the parentheses. That is, the number between the parentheses indicates the number of operations that have not been checked.

If the number of processing operations which belong to a specified processing state is changed, the second display controller 112 redisplays an image reflecting the updated number in a second mode. The second mode is a mode in which only the updated number is redisplayed, for example.

1-6. Operation of Terminal
(1) At the Start of Terminal

Figure 10:
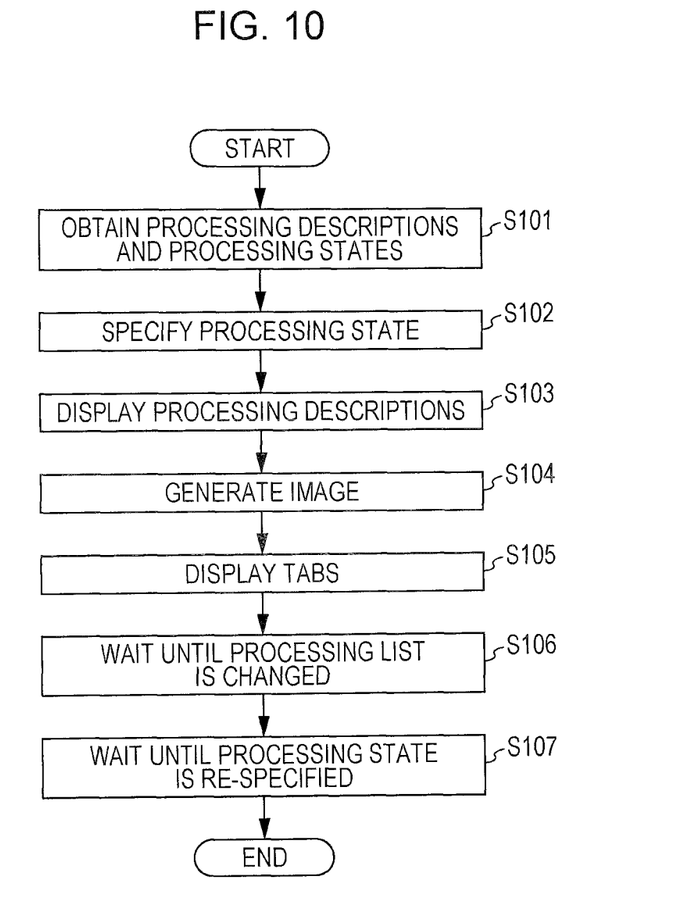
FIG. 10 is a flowchart illustrating an example of the operation at the start of a terminal.

FIG. 10 is a flowchart illustrating an example of the operation at the start of the terminal 1. In step S101, upon receiving a signal based on the processing list 321 from the server device 3, the controller 11 of the terminal 1 generates a processing list 121 based on the received signal and stores the processing list 121 in the storage unit 12. As a result, the controller 11 obtains the processing description and the processing state for each of the processing operations that the processing device 4 is instructed to execute.

In step S102, the controller 11 specifies the processing state selected by the user in accordance with a user operation received by the operation unit 15. If the operation unit 15 has not received any user operation, the controller 11 specifies a preset processing state. Then, in step S103, the controller 11 extracts processing descriptions of processing operations which belong to the specified processing state from the processing list 121, and displays the extracted processing descriptions in the first region A1 of the display unit 14.

In step S104, for each processing state, the controller 11 counts the number of processing operations which belong to the corresponding processing state and generates an image reflecting the counted number. In step S105, the controller 11 displays the images generated for the individual processing states in the second region A2. The images are displayed in the form of tabs (tab display).

In step S106, the controller 11 waits until the processing list 121 is changed in accordance with the progress of processing executed by the processing device 4. In step S107, the controller 11 waits until the processing state is respecified by the specifying unit 114 after being reselected by the user operating the operation unit 15. That is, in steps S106 and S107, the controller 11 enters the standby state in which it waits for the occurrence of one of the two events, namely, a change in the processing list 121 and respecifying of the processing state.

(2) In Response to Change in Processing List

Figure 11:
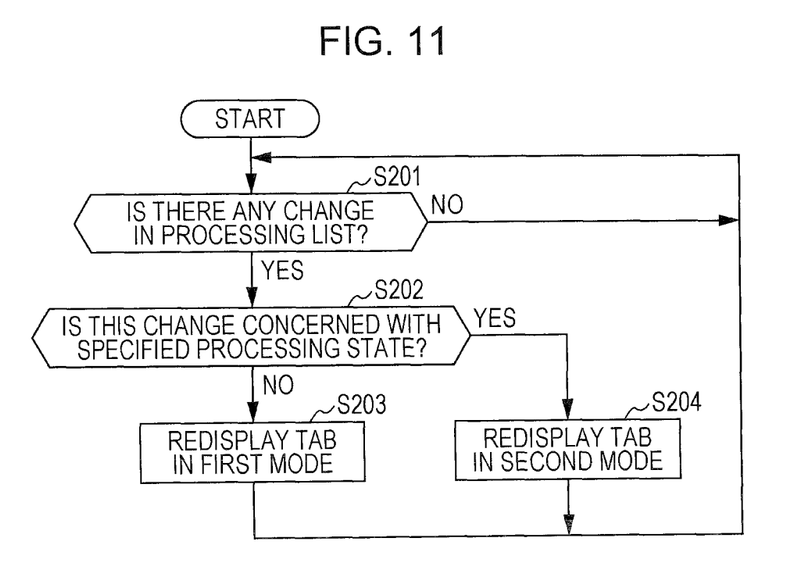
FIG. 11 is a flowchart illustrating an example of the operation executed by a terminal in response to a change in a processing list.

FIG. 11 is a flowchart illustrating an example of the operation executed by the terminal 1 in response to a change in the processing list 121. In step S201, the controller 11 determines whether there is any change in the processing list 121. If the controller 11 determines that there is no change in the processing list 121 (NO in step S201), it repeats step S201.

If the controller 11 determines in step S201 that there is a change in the processing list 121 (YES in step S201), it determines in step S202 whether this change is concerned with the processing state specified by the specifying unit 114, more specifically, whether the processing operation which has been changed belongs to the specified processing state. If the controller 11 determines that the change is not concerned with the specified processing state (NO in step S202), that is, the change is concerned with a processing state that is not specified, the controller 11 redisplays the tab of this processing state in the second region A2 in the first mode in step S203.

If the controller 11 determines that the change is concerned with the specified processing state (YES in step S202), it redisplays the tab of this specified processing state in the second region A2 in the second mode in step S204.

(3) In Response to Respecifying of Processing State

Figure 12:
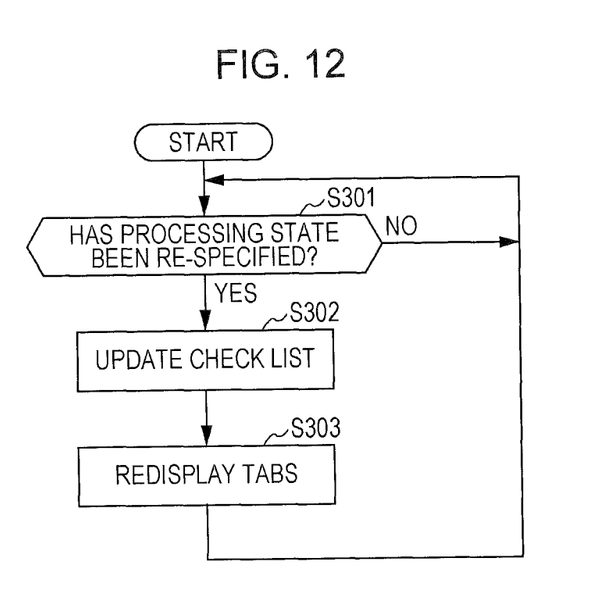
FIG. 12 is a flowchart illustrating an example of the operation executed by a terminal in response to respecifying of the processing state.

FIG. 12 is a flowchart illustrating an example of the operation executed by the terminal 1 in response to respecifying of the processing state. In step S301, the controller 11 determines whether another processing state has been specified, that is, whether the processing state has been respecified. If the controller 11 determines that the processing state has not been respecified (NO in step S301), it repeats step S301. If the controller 11 determines that the processing state has been respecified (YES in step S301), it performs control so that the descriptions of processing operations which belong to the respecified processing state will be displayed in the first region A1 in step S302 and so that the check list 122 will be updated to indicate that the displayed processing operations have been checked by the user in step S302.

Then, in step S303, for each processing state, based on the updated check list 122, the controller 11 counts the number of processing operations that have not been checked by the user. The controller 11 then redisplays the tabs of the processing states that are not specified in the second region A2 in the first mode, and redisplays the tab of the specified processing state in the second region A2 in the second mode.

(4) Example of Display Change in Second Region

Figure 13A:
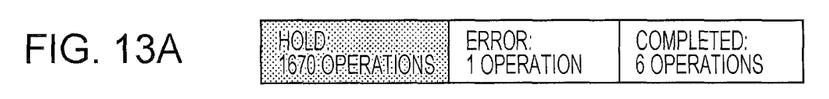
FIGS. 13A, 13B, and 13C illustrate an example of a display change in a second region.
Figure 13B:
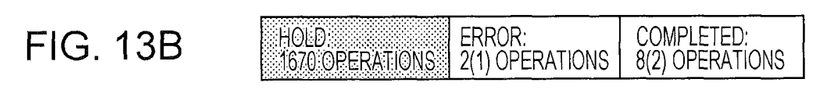
Figure 13C:
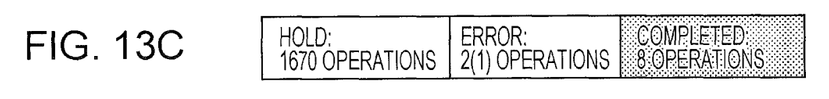

FIGS. 13A through 13C show an example of a display change in the second region A2. At a certain time point, three operations are in processing, 1670 operations are in a processing state "hold", one operation is in a processing state "error", and six operations are in a processing state "completed". If the processing state "hold" is specified, the image shown in FIG. 13A is displayed in the second region A2.

Then, the three operations in processing have progressed. One of the operations is terminated with an error, and thus, this operation belongs to the processing state "error". The remaining two operations have successfully been completed, and thus, these operations belong to the processing state "completed". Then, the image shown in FIG. 13B is displayed in the second region A2.

There is no change in the specified processing state "hold", and thus, the specified processing state "hold" remains being displayed as "hold: 1670 operations". Regarding the processing state "error" that is not specified, the total number is increased from one to two, and the updated number is "2" and the difference is "1". The processing state "error" is thus redisplayed as "error: 2(1) operations".

Regarding the processing state "completed" that is not specified, the total number is increased from six to eight, and the updated number is "8" and the difference is "2". The processing state "completed" is thus redisplayed as "completed: 8(2) operations".

Then, if the user changes the processing state to "completed" by operating the operation unit 15, the controller 11 respecifies the processing state in accordance with the user operation. The controller 11 performs control so that the background color of the rectangular portion for "completed" will be changed to a color different from that of the other rectangular portions and this rectangular portion will be redisplayed on the display unit 14 and so that the number of processing operations which belong to "completed" will be redisplayed in the second mode. Under the control of the controller 11, the display unit 14 redisplays only the updated number "8" reflecting the number of processing operations which belong to "completed", as shown in FIG. 13C.

As described above, when the number of processing operations which belong to a processing state that is not specified has changed, the processing system 9 of this exemplary embodiment is able to inform a user of this change while the descriptions of processing operations which belong to a specified processing state are being displayed.

2. Modified Examples

The above-described exemplary embodiment may be modified as in the following modified examples. Additionally, the following modified examples may be combined with each other.

2-1. First Modified Example

In the above-described exemplary embodiment, when the controller 11 of the terminal 1 determines that the processing state has been respecified, it immediately redisplays the tab of the respecified processing state in the second region A2 in the second mode. However, the controller 11 may wait for a predetermined time after determining that the processing state has been respecified, and then, redisplay the tab of the respecified processing state in the above-described manner. That is, after the lapse of a predetermined time after the specifying unit 14 has respecified the processing state, the second display controller 112 may redisplay an image reflecting the number of processing operations which belong to the respecified processing state in the second mode. This configuration enables the user to obtain information concerning a change in the number of processing operations of the respecified processing state before the predetermined time elapses.

2-2. Second Modified Example

When the controller 11 determines that the processing state has been respecified, it may wait for an instruction indicating permission from the user and then redisplay the tab of the respecified processing state in the above-described manner. In this case, the controller 11 causes the display unit 14 to display a query regarding whether the user gives a permission to redisplay the tab of the respecified processing state, and the operation unit 15 receives an operation reflecting a response from the user. That is, if the specifying unit 114 respecifies the processing state and the operation unit 15 receives an instruction indicating permission to perform redisplay from the user, the second display controller 112 may redisplay an image reflecting the number of processing operations which belong to the respecified processing state in the second mode. This configuration enables the user to obtain information concerning a change in the number of processing operations of the respecified processing state before the user gives permission explicitly.

2-3. Third Modified Example

In the above-described exemplary embodiment, the controller 11 performs redisplay, regardless of the type of processing state, in accordance with whether this processing state is specified. However, concerning a predetermined processing state, the controller 11 may perform redisplay after a certain procedure different from that of the other processing states has been taken. For example, concerning the processing state "error", the controller 11 may perform redisplay after the receiver 113 receives an instruction indicating permission from the user. More specifically, if the processing state specified by the specifying unit 114 concerns "error" and if the number of processing operations which belong to this processing state is changed, the second display controller 112 redisplays an image reflecting the updated number in the first mode. Then, if the receiver 113 receives an instruction indicating permission to perform redisplay from the user, the second display controller 112 redisplays the image reflecting the updated number in the second mode. This configuration enables the user to search for the reason why the error has occurred.

2-4. Fourth Modified Example

In the above-described exemplary embodiment, if the number of processing operations which belong to a processing state that is not specified is changed, the controller 11 redisplays the following image. A pair of parentheses is added at the right side of the updated number and the number indicating the difference between the updated number and the previous number is input between the parentheses. However, the controller 11 may redisplay an image reflecting the updated number in a different manner. For example, the controller 11 may change the thickness or the color of the name of a processing state that is not specified in accordance with the number of processing operations which belong to this processing state. Alternatively, the controller 11 may change the background color of a rectangular portion concerning a processing state that is not specified in the second region A2 in accordance with the number of processing operations which belong to this processing state. If the updated number of processing operations belonging to a processing state exceeds a preset threshold, the controller 11 may change the background color or the thickness of the name of this processing state. This configuration also enables the user to recognize that the number of processing operations which belong to a processing state that is not specified has changed.

2-5. Fifth Modified Example

In the above-described exemplary embodiment, if the number of processing operations which belong to a processing state that is not specified is changed, the controller 11 redisplays an image reflecting the updated number in the first mode. However, the controller 11 may redisplay an image only when the number of processing operations belonging to a processing state that is not specified is increased or is decreased. For example, if the number of processing operations belonging to a processing state that is not specified is increased, the controller 11 may redisplay an image indicating the increased number appended with a difference between this number and the previous number. If the number of processing operations belonging to a processing state that is not specified is decreased, the controller 11 may not necessarily redisplay the image.

2-6. Sixth Modified Example

The program executed by the controller 11 may be provided as a result of being stored in a computer readable recording medium, for example, a magnetic recording medium such as magnetic tape and a magnetic disk, an optical recording medium such as an optical disc, a magneto-optical recording medium, and a semiconductor memory. The program may be downloaded via a communication network, such as the Internet. As the control device represented by the controller 11, various devices other than the CPU may be used. For example, a dedicated processor may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A display device comprising:
a processor configured to act as:
an obtaining unit that obtains a processing description and a processing state of each of a plurality of processing operations that a processing device is instructed to execute; and
a specifying unit that specifies a processing state from among a plurality of processing states;
a fast display controller configured to control to display in a first region, among the plurality of processing operations, a processing description of a processing operation which belongs to the processing state specified by the specifying unit; and
a second display controller configured to:
control to display in a second region, that performs control for each of the plurality of processing states, an image indicating a number of processing operations which belong to a corresponding processing state,
control to redisplay in a first mode, in response to a change in the number of processing operations which belong to a processing stare that is not specified, an image indicating: (i) the changed number of processing operation in the first mode; and (ii) a number indicating a difference between the changed number of processing operations in the first mode and the number of processing operations before the change, and
control to redisplay in a second mode, in response to a change in the number of processing operations which belong to a specified processing state, an image indicating the changed number of processing operations in the second mode.

2. The display device according to claim 1, wherein, if the specifying unit specifies a different processing state, the second display controller is further configured to control to redisplay, in the second mode, an image indicating the number of processing operations which belong to the different processing state.

3. The display device according to claim 1, wherein, after a lapse of a predetermined time after the specifying unit has specified a different processing state, the second display controller is further configured to control to redisplay, in the second mode, an image indicating the number of processing operations which belong to the different processing state.

4. The display device according to claim 1,
wherein the processor is further configured to act as a receiver that receives an instruction indicating permission to perform redisplay from a user, and
wherein, if the specifying unit specifies a different processing state and if the receiver receives the instruction, the second display controller is further configured to control to redisplay, in the second mode, an image indicating the number of processing operations which belong to the different processing state.

5. The display device according to claim 1,
wherein the processor is further configured to act as a receiver that receives an instruction indicating permission to perform redisplay from a user, and
wherein, if the processing state specified by the specifying unit is concerned with an error of a processing operation, the second display controller is further configured to control to redisplay in the first mode, in response to a change in the number of processing operations which belong to the processing state concerning an error, an image indicating the changed number concerning the error, and if the receiver receives the instruction afterwards, the second display controller is further configured to control to redisplay, in the second mode, an image indicating the changed number concerning the error.

6. The display device according to claim 1, wherein, in response to an increase in the number of processing operations which belong to the processing state that is not specified, the second display contoller is further configured to control to redisplay an image indicating the increased number of processing operations appended with a number indicating a difference between the increased number of processing operations and the number of processing operations before the change.

7. A display method comprising:
obtaining a processing description and a processing state of each of a plurality of processing operations that a processing device is instructed to execute;
specifying a processing stare from among a plurality of processing states;
performing control to display in a first region, among the plurality of processing operations, a processing description of a processing operation which belongs to the specified processing state; and
performing control to display in a second region, for each of the plurality of processing states, an image indicating a number of processing operations which belong to a corresponding processing state;
performing control to redisplay in a first mode, in response to a change in the number of processing operations which belong to a processing state that is not specified, an image indicating: (i) the changed number of processing operations in the first mode; and (ii) a number indicating a difference between the changed number of processing operations in the first mode and the number of processing operations before the change; and
performing control to redisplay in a second mode, in response to a change in the number of processing operations which belong to a specified processing state, an image indicating the changed number of processing operations in the second mode.

8. A non-transitory computer readable medium storing a program causing a computer to execute a process, the process comprising:
obtaining a processing description and a processing state of each of a plurality of processing operations that a processing device is instructed to execute;
specifying a processing state from among a plurality of processing states;
performing control to display in a first region, among the plurality of processing operations, a processing description of a processing operation which belongs to the specified processing state;
performing control to display in a second region, for each of the plurality of processing states, an image indicating a number of processing operations which belong to a corresponding processing state;
performing control to redisplay in a first mode, in response to a change in the number of processing operations which belong to a processing state that is not specified, an image indicating: (i) the changed number of processing operations in the first mode; and (ii) a number indicating a difference between the changed number of processing operations in the first mode and the number of processing operations before the change; and
perforating control to redisplay in a second mode, in response to a change in the number of processing operations which belong to a specified processing state, an image indicating the changed number of processing operations in the second mode.

* * * * *